United States Patent [19]

McRae

[11] 4,146,455

[45] Mar. 27, 1979

[54] PROCESS FOR TREATING WHEY

[75] Inventor: Wayne A. McRae, Pelham, N.H.

[73] Assignee: Ionics Inc., Watertown, Mass.

[21] Appl. No.: 897,834

[22] Filed: Apr. 19, 1978

[51] Int. Cl.$^2$ .............................................. B01D 13/02
[52] U.S. Cl. ............................... 204/180 P; 204/301;
424/34; 424/41; 204/180 R
[58] Field of Search ............... 204/180 P, 301, 180 R;
424/34, 41

[56] References Cited

U.S. PATENT DOCUMENTS

| 956,246 | 4/1910 | White et al. | 204/180 R |
|---|---|---|---|
| 1,022,523 | 4/1912 | Whitney | 204/180 R |
| 2,631,100 | 3/1953 | Aten et al. | 204/180 P X |
| 3,544,436 | 12/1970 | Francis et al. | 204/180 P |
| 3,595,769 | 7/1971 | Scheder | 204/180 P |
| 3,677,923 | 7/1972 | Bier | 204/180 R X |
| 3,751,356 | 8/1973 | Takeya et al. | 204/180 R X |
| 3,767,548 | 10/1973 | Okada et al. | 204/180 P |
| 3,905,886 | 9/1975 | Wang | 204/180 P |
| 4,043,896 | 8/1977 | Ahlgren | 204/301 |

Primary Examiner—Arthur C. Prescott
Attorney, Agent, or Firm—Norman E. Saliba

[57] ABSTRACT

A process for treating liquid whey is disclosed in which raw whey is first partially demineralized by electrodialysis and then subjected to forced flow electrophoresis to effect the separation of lactose and a simultaneous increase in the percentage solids content in the resulting product whey solution.

4 Claims, 1 Drawing Figure

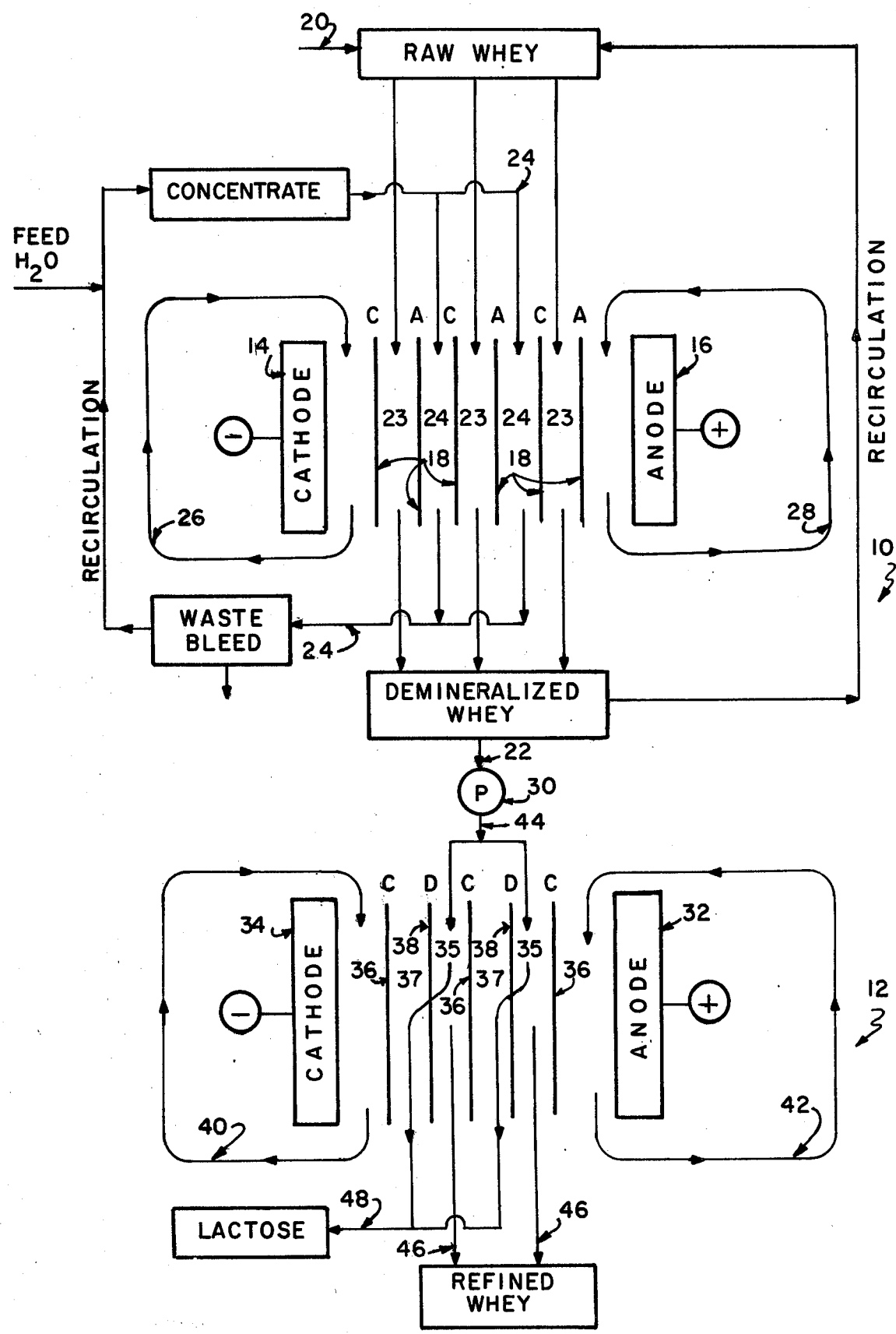

PROCESS FOR TREATING WHEY

BACKGROUND OF THE INVENTION

1. Field of the Invention

The invention resides in the field of the treatment of protein solutions and more particularly relates to methods for improving the quality of liquid whey by demineralizing and lactose separation.

2. Description of the Prior Art

The treatment of liquid whey to increase the desirable protein content and decrease the ash and lactose components has been the object of a variety of processes described in the prior art. It is widely recognized that electrodialysis is an excellent method for separating undesirable ash or demineralizing whey which results as a by-product of various cheese manufacturing operations. U.S. Pat. No. 3,615,664, L. H. Francis, discloses a technique in which lactose is removed from whey by concentration of the raw whey resulting in lactose crystallization, crystal removal by hydraulic or centrifugal separation, heating to eliminate residual crystals and clarifying. The resultant whey is then subjected to electrodialysis to effect demineralization. Similarly, U.S. Pat. No. 3,447,930, by the same inventor, describes the process in reverse, that is, first demineralizing by electrodialysis and then separating lactose from the whey by the above procedure. U.S. Pat. No. 3,687,682, J. R. Schneder, discloses an improved electrodialysis cell arrangement which is used to remove ash from whey after which lactose is again removed by concentration and crystallization.

These and other prior art methods consist of innovative techniques directed to the purpose of obtaining a refined high protein whey end product which is suitable for use as a food ingredient. Among the concerns which arise in carrying out these processes are the denaturation of whey protein, lactalbumin, during the application of heat to effect concentration and crystallization; clogging of electrodialysis cells by protein precipitates; the speed, volume, and efficiency of operation; and the energy requirements of the processing equipment.

It has now been found that many of the difficulties of previous methods may be overcome by removing lactose from demineralized whey by the technique of forced flow electrophoresis as opposed to crystallization. Additionally, the percentage solids content of the whey is substantially increased at the same time since a large amount of liquid is removed simultaneously with the lactose. The benefits of this approach are several, among which are the minimization of heat which leads to a certain amount of denaturation, the elimination of numerous separate pieces of equipment which are required for concentration and crystallization, and the ability to create a compact processing unit utilizing basic electrolytic cell apparatus which may be arranged in a stack configuration combining both the electrolysis and electrophoresis process.

Forced flow electrophoresis is a method for separating and/or concentrating ions or molecules contained in a liquid by employing a hydrodynamic force and an electric current. An electrophoresis apparatus is used having liquid flow compartments defined by neutral and ionically charged membrane separators. The electrophoresis technique is fully disclosed in the prior art such as U.S. Pat. Nos. 2,878,178, 3,519,549, 3,829,370 and others.

SUMMARY OF THE INVENTION

The invention may be summarized as an electrolytic whey treatment process consisting of the steps of demineralizing (ash removal) by electrodialysis and thereafter lactose separation accompanied by a decrease in liquid content by forced flow electrophoresis. In the electrodialysis step which is preferably carried out before electrophoresis (to minimize the electrical energy required during lactose separation) warm raw whey, preferably having a total solids content of between 15-24% is passed through an electrodialysis cell having alternating anion and cation permselective membranes. A potential impressed across the cell results in the migration of salts such as potassium and sodium chloride in the ionic state out of the whey stream and through the ion-selective membranes where they are collected as waste. It had previously been determined that the electrodialysis process is more efficient at a warm temperature of about 35°-40° C. as compared to lower temperatures such as 15°-22° C. At the same current efficiency, the warmer temperatures gave a 22% higher production rate (22% more ash removed) without adversely affecting the whey.

The demineralized whey is then force flowed through an electrophoresis cell having alternating electrically neutral substantially monodisperse microporous diffusion membranes and permselective cation membranes. Under the influence of an electric field established across the cell and the forced flow created by the hydrostatic pressure difference between the sections of the cell separated by the diffusion membranes, lactose and water will migrate out through the diffusion membrane as permeate and lactalbumin will remain in the whey feed stream. Since, in the diffusion process, a substantial amount of liquid entering the cell is removed from the whey at the same time as the lactose, the percentage solids content of the whey stream is greatly increased thus reducing or eliminating the need for further concentration by evaporation.

These and other features and advantages of the invention will become more clear from the following description of the preferred embodiment and the drawing.

DESCRIPTION OF THE DRAWING

The FIGURE is a schematic cross-sectional representation of the apparatus used in the process of the invention.

DESCRIPTION OF THE PREFERRED EMBODIMENT

Referring to the FIGURE, there is shown in schematic respresentation an electrodialysis cell 10 and an electrophoresis cell 12. Each cell is composed of a cathode, an anode, and a plurality of separating membranes. In the electrodialysis cell 10, cathode 14, anode 16 and ion perselective membranes 18 function to separate the salts from raw whey entering in stream 20 and exiting in stream 22. The whey passes through desalting chambers 23 defined between alternating cation membranes, C, and anion membranes, A, held and separated in a stack by means not shown but well known in the prior art. Tortuous path spacer compartments of the type disclosed in U.S. Pat. Nos. 2,708,658 and 2,891,899 can be employed to separate the membranes from each other to form alternating desalting and concentrating chambers or compartments. The combination of a desalting and concentrating chamber constitutes a cell pair. Any number of cell pairs can be stacked between a pair of electrodes to produce a demineralization stack containing typically 100 cell pairs or more. Such systems are more fully described in U.S. Pat. Nos. 2,694,680, 2,752,306, 2,848,403, 2,891,899, 3,003,940, 3,341,441, and 3,412,006. The manufacture and properties of ion-selective membranes of the type employed in the electrodialysis systems are fully discussed in U.S. Pat. No. Re. 24,865, U.S. Pat. Nos. 2,730,768, 2,702,272, 2,731,411 and many others. Under the influence of the electrical potential across the cell, positively charges sodium and potassium ions migrate through cation membranes C into waste compartments or concentrate (brine) stream 24. Similarly, negatively charged chloride ions pass through anion membranes A into the waste stream. Although the above mentioned ions comprise the main body of the undesirable salts, other ionic substances are or may also be removed in a like manner. Additionally, in the operation of the cell, a recirculating electrolyte stream 26 is passed in contact with the cathode and a similar stream 28 in contact with the anode.

Demineralized whey collected from stream 22 may now be introduced into the feed compartments 35 of the electrophoresis cell 12 under pressure by pump 30. Cell 12 consists of anode 32, a cathode 34, cation selective membranes 36 and electrically neutral microporous diffusion or dialysis membranes 38. Electrode streams of electrolytes are also circulated as shown at 40 and 42. Forced flow of the entering whey stream 44 creates a pressure differential across diffusion membranes 38 causing neutral (non-charged) lactose to pass out of the whey and into the permeate compartments 37 along with a substantial quantity of the liquid content of the whey stream. In protein, mostly negatively charged lactalbumin, is prevented from passing toward the positively charged anode by cation-selective membranes 36 and therefore held within the whey stream. The weight percentage of protein in the stream is thus greatly increased as a result of the expulsion of lactose and liquid into the permeate stream by the electrophoresis process. Refined high protein whey is drawn off in effluent whey stream 46 and lactose in permeate stream 48.

As was mentioned above, both the electrodialysis and electrophoresis cells may be part of a single stack apparatus to provide a further economy of operation. The refined high protein whey produced by the above process is equivalent in quality to that produced by the concentration and crystallization methods without the need for extensive evaporating equipment and without the need to subject the whey to excess heat which can result in denaturation.

Although not fully shown in the drawing, those skilled in the art will realize that the solutions passing through the various compartments of the cells (both the electrodialysis and electrophoresis cells) may be recirculated by pumps through respective recirculating holdup tanks or reservoirs. Where the cells are employed in a batch type operation, a batch volume of each solution is merely recirculated through the respective holdup tanks until the desired concentration or dilution is obtained.

An alternate flow arrangement is a feed and bleed operation where fresh solution is continuously added into the respective recirculating tanks or reservoirs at a controlled rate. In turn the overflow or bleed or solution occuring from the various recirculating tanks can be collected as product or dumped to waste.

The following examples serve to illustrate typical parameters of the process.

EXAMPLE 1

The electrodialysis apparatus employed is the Stack-Pack ® type available from ionics, Inc., Watertown, Mass., U.S.A. It has an electrodialysis stack consisting of 20 cell pairs, each pair having an effective membrane area of about 220 sq.cm. The anion and cation transfer membranes are the Ionics membrane types, 103 QZL-386 and 61 CZL-386 respectively. Twenty liters of natural whole sweet whey concentrated to a total solids content of about 22.6% is treated in a batchwise process. The temperature is maintained at about 39° C. The waste stream pH is maintained at about 3.0. The recirculating flow rate in the whey stream is maintained at about 1.4 liters per minute. The operating schedule is approximately as follows:

| Time in Minutes | Whey Resistivity in ohm cm.$^2$ | Waste Resistivity in ohm cm.$^2$ | Current in Amperes |
|---|---|---|---|
| 0 | 60 | 60 | 6.8 |
| 2 | 60 | 60 | 6.8 |
| 7 | 60 | 60 | 6.4 |
| 14 | 65 | 65 | 6.1 |
| 27 | 70 | 70 | 5.7 |
| 30 | 80 | 80 | 5.3 |
| 38 | 95 | 95 | 5.3 |
| 45 | 105 | 105 | 5.0 |
| 51 | 120 | 120 | 4.9 |
| 57 | 135 | 135 | 4.5 |
| 63 | 150 | 150 | 4.1 |
| 69 | 165 | 165 | 3.7 |
| 75 | 185 | 185 | 3.3 |
| 81 | 205 | 205 | 3.0 |
| 87 | 225 | 225 | 2.8 |
| 105 | 290 | 290 | 2.4 |
| 125 | 350 | 300 | 2.0 |
| 160 | 425 | 300 | 1.7 |
| 200 | 600 | 300 | 1.4 |

EXAMPLE 2

The anion membranes are removed from the electrodialysis stack of example 1 and replaced with Yumicron ® Type Mf 250 microporous diaphragms available from Yuasa Battery Company, Tokyo, Japan. The straps employed to produce liquid turbulence are removed from the tortuous path of the spacers comprising the permeate compartments (the compartments on the cathode side of the microporous diaphragms) and the strapless tortuous path is filled with a screen type Vexar ® plastic material 20 PDS 129 available from E. I. du Pont de Nemours. The permeate compartments and respective reservoir are filled with water adjusted with saturated sodium chloride to have an electrical resistivity of about 225 ohm cm$^2$ at about 39° C. The feed compartments and respective holdup tank or reservoir are initially filled with water adjusted with saturated sodium chloride to have an electrical resistivity of about 600 ohm cm$^2$ at about 39° C. The two streams are recirculated via their respective reservoirs or holdup tanks and the feed stream pressurized over the permeate stream to give a total flow rate through the microporous diaphragms of about 130 ml/min. as measured by the liquid overflow from the permeate reservoir. A direct current voltage of about 4 volts per cell pair is applied at a polarity which causes positively charged ions (cations) to pass from the feed comaprtments to the permeate compartments. The effluent from the feed compartements is then sent to waste and the feed stream is switched from dilute sodium chloride solution to the partially demineralized concentrated whey of Example 1. The voltage is readjusted to give an overflow rate from the permeate reservoir of about 130 ml. per minute. When they begins to appear in the effluent from the feed compartments, the stream is recirculated to the whey reservoir. The whey recirculation is continued for about 105 minutes at which point the whey volume is about 4.5 liters and has the following approximate analysis.

| | |
|---|---|
| Protein | 12% |
| Lactose Hydrate | 20% |
| Ash | 0.5% |
| Total Solids | 32.5% |

This invention has been described with reference to specific preferred embodiments thereof, but it is contemplated that modification thereto will occur to those skilled in the art, and that such modifications may be made without departing from the scope of the invention.

The embodiments of the invention in which an exclusive property or privilege is claimed are defined as follows:

1. A process for the treatment of liquid whey comprising the steps of: first demineralizing said whey by subjecting the whey to electrodialysis to effect a substantial reduction in ash content; then subjecting said demineralized whey to forced flow electrophoresis to effect therefrom a separation and a substantial reduction in lactose content and a simultaneous increase in the percentage of protein solids content in the resultant whey product.

2. The process of claim 1 whereby the electrodialysis process is performed at a temperature of between 35°–40° C. on liquid whey having a total solid content of about between 15–24%.

3. The process of claim 2 whereby the whey is demineralized until its resistivity is at least about 600 ohm $cm^2$.

4. The process of claim 1 whereby the forced flow electrophoresis process is continued until the solid content of the whey being treated has reached a concentration of at least 30%.

* * * * *